US008988367B2

(12) United States Patent
Walley et al.

(10) Patent No.: US 8,988,367 B2
(45) Date of Patent: Mar. 24, 2015

(54) SYSTEMS AND METHODS FOR PROVIDING ENHANCED TOUCH SENSING (75) Inventors: John Walley, Ladera Ranch, CA (US); Robert Lukas, Vancouver (CA); David Sobel, Los Altos, CA (US); Sumant Ranganathan, Saratoga, CA (US); Tianhao Li, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 526 days.

(21) Appl. No.: 13/020,613

(22) Filed: Feb. 3, 2011

(65) Prior Publication Data
US 2011/0193809 A1 Aug. 11, 2011

Related U.S. Application Data (60) Provisional application No. 61/337,641, filed on Feb. 5, 2010.

(51) Int. Cl.
*G06F 3/041* (2006.01)
*G06F 3/044* (2006.01)
*G06F 3/045* (2006.01)
*G06F 1/32* (2006.01)

(52) U.S. Cl.
CPC ............... *G06F 3/044* (2013.01); *G06F 3/045* (2013.01); *G06F 1/3262* (2013.01)
USPC ..................... 345/173; 178/18.05; 178/18.06

(58) Field of Classification Search
USPC .......... 345/156, 173; 178/18.01, 18.05–18.06
See application file for complete search history.

(56) References Cited

U.S. PATENT DOCUMENTS

| 6,124,848 | A  | * | 9/2000  | Ballare et al. ................. 345/179 |
| 7,154,483 | B2 | * | 12/2006 | Kobayashi ..................... 345/173 |
| 8,077,163 | B2 | * | 12/2011 | Qi ................................ 345/177 |
| 8,542,186 | B2 | * | 9/2013  | Alameh et al. ................ 345/156 |
| 2008/0157782 | A1 | * | 7/2008 | Krah ............................. 324/538 |

* cited by examiner

*Primary Examiner* — Abbas Abdulselam
(74) *Attorney, Agent, or Firm* — Oblon, McClelland, Maier & Neustadt, L.L.P.

(57) ABSTRACT

Provided are systems and methods for providing enhanced touch sensing. One system providing enhanced touch sensing includes a multi-mode touch screen and a processor configured to apply at least one test signal to a sense element of the multi-mode touch screen, detect at least one return signal from the sense element, and then determine a relative position of an object corresponding to the at least one return signal, the multi-mode touch screen being capable of sensing the first object using first and second detection modes. One multi-mode touch screen comprises a multi-mode multi-touch touch screen. One processor is configured to apply an adaptive test signal to a sense element of a touch screen.

28 Claims, 5 Drawing Sheets

Fig. 5

SYSTEMS AND METHODS FOR PROVIDING ENHANCED TOUCH SENSING

RELATED APPLICATIONS

This application is based on and claims priority from U.S. Provisional Patent Application Ser. No. 61/337,641 filed on Feb. 5, 2010, which is hereby incorporated by reference in its entirety.

BACKGROUND OF THE INVENTION

1. Field of the Invention

The present invention relates generally to electronic devices and systems. More particularly, the present invention relates to touch sensitive user interfaces for electronic devices and systems.

2. Background Art

Conventional touch sensitive surfaces utilized as graphical user interfaces in an ever-increasing variety of popular electronic devices and systems often provide a less than optimal user experience.

For example, although many electronic games and media are designed to accept three or more user inputs to enable a responsive and detailed interactive experience, typical touch sensitive surfaces only accept single touch inputs or are subject to significant errors in touch sensing or even complete cancellation of inputs when attempting to sense two or more objects in contact with the surface or the multiple touch points corresponding to those objects. Moreover, although some modes of operation may be configured to optimize sensing one type of user input in one context, a specialized mode of operation often lacks desirable features of other modes of operation, which significantly limits the utility of an electronic device utilizing the single-mode optimized touch sensitive surface.

Attempts to correct for the conventional lack of functionality include reusing one of a selection of conventional modes of operation and relying heavily on an increase in the number of sense elements of a touch sensitive surface to mitigate the problems of conventional systems, as outlined above. This necessitates a significant increase in cost associated with increased signal processing, increased signal traces, and increased power needs, especially as the size of the touch sensor is increased. Alternative correction attempts include research and development of touch sensors comprising new materials, but these processes and materials are substantially untested in real-world use and are typically expensive to implement, especially relative to materials already in use for touch sensing.

Accordingly, there is a need to overcome the drawbacks and deficiencies in the art by providing a touch screen user interface methodology that enhances touch sensing capabilities while leveraging inexpensive touch screen manufacturing techniques.

SUMMARY OF THE INVENTION

The present application is directed to systems and methods for providing enhanced touch sensing, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to systems and methods for providing enhanced touch sensing. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1A:
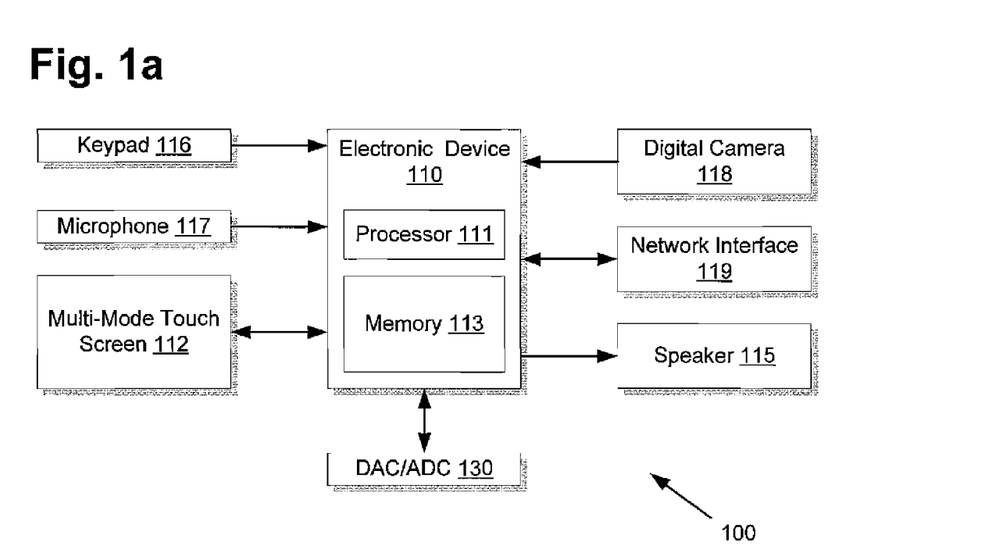
FIG. 1a presents a diagram of an electronic device for providing enhanced touched sensing according to one embodiment of the present invention.
Figure 1B:
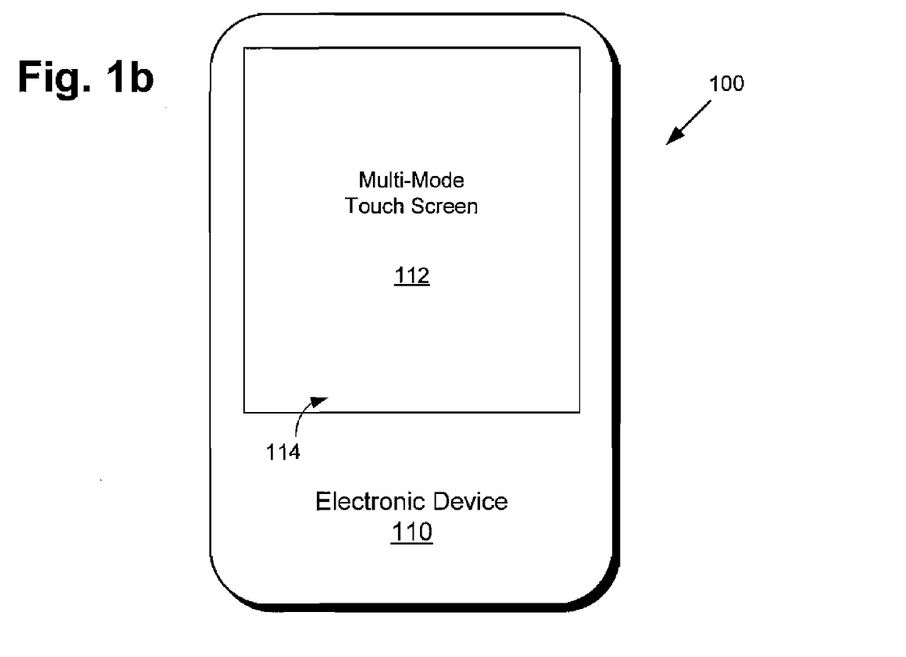
FIG. 1b presents an illustration of the electronic device in FIG. 1a, according to one embodiment of the present invention.

FIGS. 1a and 1b show an electronic device including a touch sensitive screen configured for multi-mode touch sensing in user environment 100, according to one embodiment of the present inventive concepts. According to the embodiment shown in FIG. 1b, electronic device 110 includes multi-mode touch screen 112 having touch surface 114. By configuring multi-mode touch screen 112 to include more than one mode of sense functionality, such as more than one capacitive sensing functionality, for example, or both capacitive and resistive sensing functionality across touch surface 114, a user of electronic device 110 is provided with a more flexible, responsive, and nuanced user experience when interacting with electronic device 110.

Touch detection can be accomplished through a variety of capacitive and resistive detection modes, for example. Multimode capacitive touch detection offers certain advantages over resistive touch detection. For instance, capacitive touch detection may be configured to be highly sensitive and responsive to the proximity of a human touch, either at or near a touch surface, such as touch surface 114. Furthermore, unlike a conventional resistive detection sense element, for example, which requires the application of some degree of force to, for example, a portion of touch surface 114, a capacitive touch sense element may be configured to be responsive to a soft surface contact, and may even be configured to sense surface proximity (e.g., a hover touch) in the absence of actual surface contact.

To illustrate, a mutual-capacitance capacitive touch detection mode, where changes in a fringe capacitance between capacitive detection sense elements may be detected, for example, may be configured to be highly sensitive to a presence or close proximity of a human finger, for example, though may not be as accurate with respect to relative position of the human finger to a touch surface, for example, or with respect to far proximity or soft touch of the human finger, as other touch detection modes. A self-capacitance capacitive touch detection mode, on the other hand, where changes in a capacitive detection sense element's own capacitance may be detected, for example, may be configured to reliably and accurately detect far proximity, soft touch, and relative position of a human finger on a touch surface, for example, but be relatively inaccurate when used to distinguish between gradations of proximity between contact and far proximity, for example.

As a result, a touch screen configured for sensing objects using one or more capacitive detection modes can provide a delicately responsive user interface when the inputs to the touch screen are provided by a human touch. Furthermore, because a self-capacitance capacitive detection mode may be configured to measure capacitance of sense elements relative to ground, for example, such a mode may be configured as single-ended, where only one XXX i/o port active electrode per sense element is needed to detect a human touch. By selectively enabling such a mode, a touch screen may be capable of detecting relative position and distinguishing between proximity and a contact while in a low power mode, for example.

However, there are circumstances in which any capacitive touch detection mode may provide an inferior user experience when compared to resistive touch detection. For example, although a capacitive detection mode may be configured to be reasonably accurate in identifying a touch position produced by an object sized similarly to a human fingertip, its accuracy typically declines as the dimensions of the object become finer, regardless of the type of capacitive detection mode used. Thus, although a single-mode or multi-mode capacitive detection mode touch screen may respond appropriately when a human finger is used to select an icon or activate a radio button displayed on the touch screen, for example, such a touch screen may provide much less satisfaction to a user attempting to draw or write an intricate shape or character on the touch screen.

In addition, capacitive touch detection, although sensitive to a human touch or the proximity of a human touch, may be far less responsive when the user input is mediated by an inanimate tool or object, such as an inexpensive plastic stylus, and when a human touch is delivered through an intermediary layer, such as a mitten or glove, for example. Thus, a user desiring to utilize a stylus to input fine touches or to draw fine figures or characters on a capacitive detection mode touch screen is likely to encounter failure or at least frustration in their attempts. Further, in a cold environment, for example, a user wearing gloves may find their formerly sensitive touch screen to be relatively unresponsive when it is configured to provide capacitive touch detection. By contrast, a touch screen configured to utilize a resistive detection mode is more accurate than a capacitive detection mode interface in identifying small touch points and delicately drawn figures and characters, as well as in identifying firmly applied touches delivered through gloves or other outerwear items.

By configuring a communication device, such as electronic device 110 in FIGS. 1a and 1b, to provide a touch sensitive user interface configured for multiple capacitive detection modes, or both a resistive detection mode and one or more capacitive detection modes, such as multi-mode touch screen 112, the user experience can be substantially enriched and improved. For example, due to its responsiveness to both capacitively detected inputs and resistively detected inputs, multi-mode touch screen 112 can provide accurate and sensitive response to a bare human touch, a fine touch point produced by a stylus, figures or characters drawn using the stylus, and to touches delivered through gloves or clothing.

Referring to FIG. 1a, electronic device 110 may additionally include processor 111, memory 113, speaker 115, keypad 116, microphone 117, digital camera 118, network interface 119 and digital-to-analog converter/analog-to-digital converter (DAC/ADC) 130. Electronic device 110 may comprise, for example, any device capable of accepting user input using keypad 116, microphone 117, digital camera 118, and/or multi-mode touch screen 112, for example, and outputting to multi-mode touch screen 112 and/or speaker 115. Electronic device 110 may also comprise, for example, any device capable of providing user communication with, for example, one or more other electronic devices over a network (not shown) accessed through use of network interface 119. Network interface 119 may additionally be configured to access other electronic devices directly. Although electronic device 110 is depicted in FIG. 1a as including each of the above components, the inclusion or exclusion of any such components is not meant to limit the present inventive concepts.

It is noted that although electronic device 110 is presented in FIGS. 1a and 1b in the context of, for example, a touch screen mobile telephone or personal digital assistant (PDA), in other embodiments, multi-mode touch screen 112 can be implemented in any electronic device or system in which a touch sensitive user interface is desirable. For example, in addition to electronic device 110, multi-mode touch screen 112 may be implemented in a tablet computer, gaming system, or electronic kiosk, for example.

Multi-mode touch screen 112 in FIG. 1a may, for example, comprise an integrated or external LCD, or the like. In addition, as noted above, multi-mode touch screen 112 may comprise a touch screen capable of supporting at least first and second detection modes, such as a capacitive detection mode and at least one type of resistive detection mode, for example, or multiple capacitive detection modes. For example, one type of resistive detection mode includes utilizing a sense element of multi-mode touch screen 112 to sense an object in contact with touch surface 114. In one embodiment, a sense element of multi-mode touch screen 112 may comprise one resistive layer situated over and insulated from a second resistive layer, such that the second resistive layer comes in contact with the first resistive layer when an object presses upon the second resistive layer with sufficient force. In one embodiment, both resistive layers may comprise indium-tin-oxide, for example. When a test signal generated using, for example, DAC/ADC 130, is applied to, for example, the first resistive layer of the sense element, a return signal from, for example, the second resistive layer of the sense element may indicate a relative position of the object, in the area of the surface element receiving the test signal, where the second layer contacts the first layer. DAC/ADC 130 may comprise multiple analog and digital converters working substantially concurrently in order to support multiple concurrent test signals and return signals, for example.

In one embodiment, a return signal may be coupled to a power-efficient comparator (not shown in FIG. 1a), for example, to determine only whether the relative position of the object is within the bounds of the sense element. Such embodiment may be one detection mode of multi-mode touch screen 112 that is used, for example, in a low power or sleep state for electronic device 110, and may be used to detect a wake-up signal by a user, for example. In other embodiments, a return signal may be coupled to, for example, DAC/ADC 130 in order to determine a more precise relative position of an object within the bounds of a source element. For instance, by alternatively applying a test signal to one resistive layer and measuring a return signal across the other resistive layer, using DAC/ADC 130 for example, a precise relative position of an object on touch surface 114 that corresponds to each return signal can be determined. Circuit diagrams describing embodiments of such operation are shown in the top half of FIG. 5, referencing measuring x-axis and y-axis positions of an object that is pressing into a top resistive layer such that the top resistive layer is making electrical contact with a bottom resistive layer.

Another possible type of resistive detection mode for multi-mode touch screen 112 is a pressure sensitive resistive detection mode, where a sense element of similar construction to the sense element described above may be used to distinguish a soft touch position from a hard touch position. For example, by measuring a pressure sensitive resistance of an ohmic contact formed by an object touching multi-mode touch screen 112, a range of pressures for the contact may be determined so as to enable distinguishing between, for example, a soft touch and a hard touch. Circuit diagrams describing such operation are shown in the bottom half of FIG. 5, referencing measuring pressure and width through use of, for example, multiple arrangements of DAC/ADC 130 and a sense element and/or the addition of a load resistance.

Figure 5:
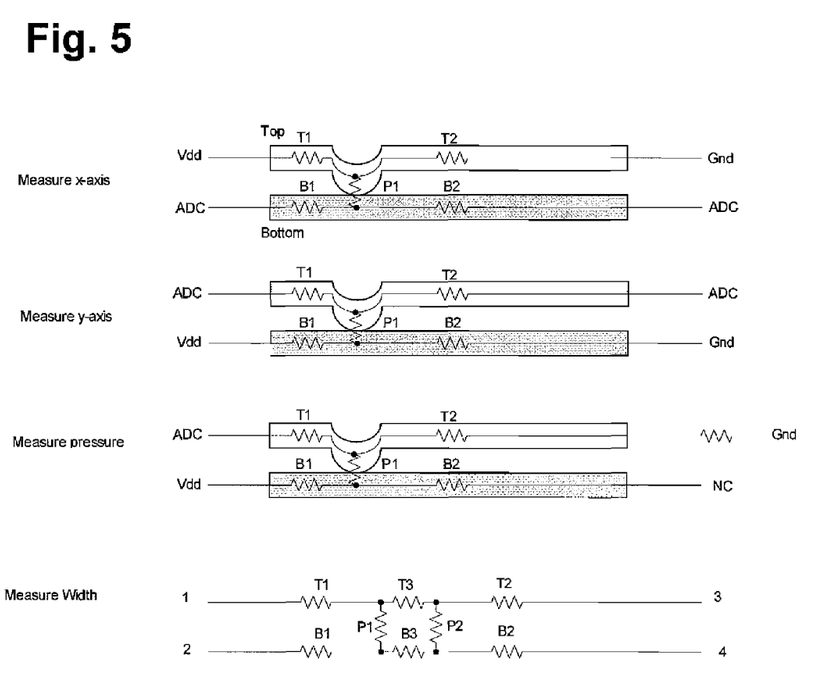
FIG. 5 presents a selection of circuit diagrams illustrating methods for providing enhanced touched sensing according to one embodiment of the present invention.

For instance, with respect to the width measurement diagram, a first step may comprise setting terminal 1 to Vdd, terminal 4 to ground, and measuring terminals 3 and 2 using DAC/ADC 130, a second step may comprise setting terminal 2 to Vdd, terminal 3 to ground, and measuring terminals 1 and 4 using DAC/ADC 130, and a third step may comprise using processor 111, for example, to solve the resulting system of equations for a T3/B3 average corresponding to a width of a top layer contacting a bottom layer. By measuring a width in either or both dimensions, for example, an estimation of the force with which a touch is being performed may be determined, and thus a soft touch may be distinguished from a relatively hard touch. Moreover, by including a pressure sensitive functionality with the position sensitive functionality described above, embodiments of the present invention may distinguish between a soft touch position and a hard touch position of an object in contact with the touch screen.

In additional embodiments, one or more capacitive detection modes may use the same sense elements as those used to enable a resistive detection mode, thereby enabling multiple resistive and multiple capacitive detection modes to operate substantially concurrently by, for example, rapidly switching between detection modes. For example, using a two-layer sense element, such as the two-layer sense element described above with respect to a resistive detection mode, changes in a capacitance of the sense element may be measured by applying a test signal to the sense element, detecting a return signal corresponding to the change in the capacitance between the layers of the sense element, and then using the return signal to determine a relative position of an object causing the change in capacitance. As is noted above, a capacitive detection mode may detect a position of an object in proximity with a sense element (e.g., a hover touch), as well as a position of an object in direct contact with a sense element, because the proximity of an object may by-itself produce a change in capacitance of a sense element of the touch screen. In addition, however, the same two-layer sense element may additionally be used to detect mutual-capacitance with another sense element, and provide additional capacitive sense functionality, as described above. Thus, embodiments of the present invention, particularly where multi-mode touch screen 112 is configured to support both a pressure sensitive resistive detection mode and one or more capacitive detection modes, may reliably distinguish between a hover touch position, a soft touch position, and a hard touch position.

All modes of operation may be managed and enabled through use of a processor, such as processor 111, for example. For instance, processor 111 may be configured to selectively apply test signals to one or more sense elements of multi-mode touch screen 112, to detect at least one return signal from each sense element, and determine a relative position of an object corresponding to a return signal, as described above. All test signals may be applied and all return signals detected substantially concurrently, for example, or in a time-multiplexed mariner, for instance, depending on whether responsiveness or reduced power consumption is prioritized, for example, or to help differentiate one sense element from another. Moreover, this process may be performed with respect to multiple detection modes substantially concurrently, for example, where one test signal may be used to detect a touch through multiple detection modes, for example. In other embodiments, test signals for each detection mode may be applied in a time-multiplexed manner, for example, in order to help distinguish one detection mode from another.

By being able to selectively apply test signals to one or more sense elements, as described above, processor 111 may segregate multi-mode touch screen 112 into portions having different enabled detection modes, for example, in order to reduce power usage, for example, or to enable application-specific functionality. It should be understood that although DAC/ADC 130 is shown in FIG. 1 as separate from processor 111 and multi-mode touch screen 112, in other embodiments, DAC/ADC 130 may be integrated into either or both processor 111 and multi-mode touch screen 112.

Figure 2A:
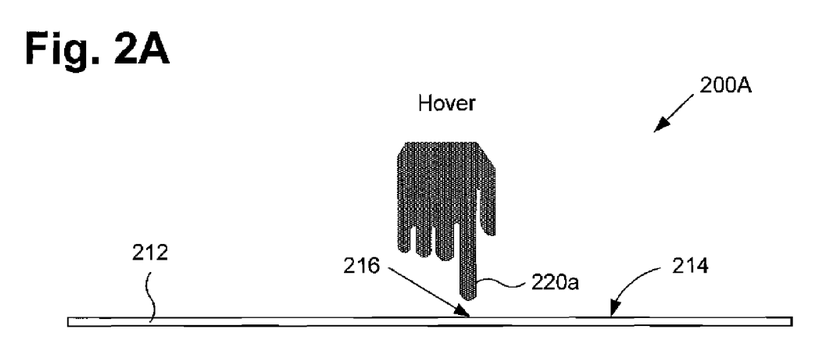
FIG. 2a presents a diagram of a system and method for providing enhanced touched sensing according to one embodiment of the present invention.
Figure 2B:
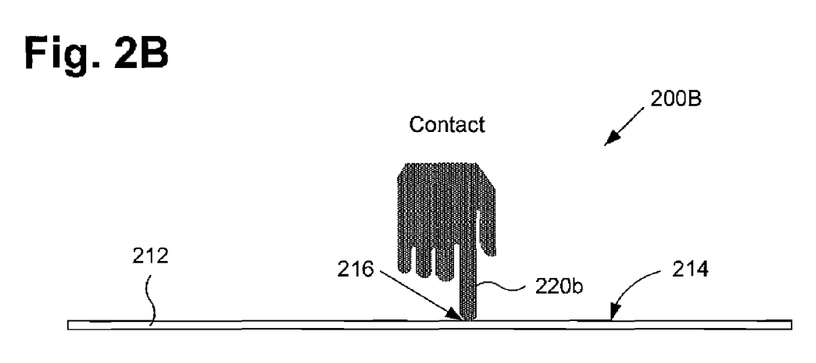
FIG. 2b presents a diagram of a system and method for providing enhanced touched sensing according to one embodiment of the present invention.
Figure 2C:
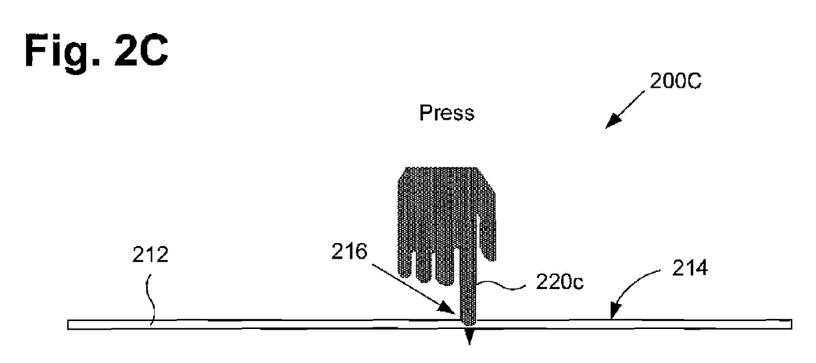
FIG. 2c presents a diagram of a system and method for providing enhanced touched sensing according to one embodiment of the present invention.

Combining multiple capacitive detection modes or one or more capacitive detection modes and a pressure sensitive resistive detection mode in a single touch screen enables a type of multi-mode touch sensitivity to a single touch point having no analogue in conventional touch screen solutions relying on any single type of capacitive or resistive sensing. For example, FIGS. 2A through 2C each represents a distinct type of user touch interaction with a common touch point. Referring to FIGS. 2A through 2C, respective touch input environments 200A, 200B, and 200C, show respective user touches 220a, 220b, and 200c being applied at touch point 216 on touch surface 214 of multi-mode touch screen 212. Multi-mode touch screen 212 including touch surface 214 corresponds to multi-mode touch screen 112 including touch surface 114, in FIGS. 1a and 1b; e.g., each corresponding structure may be configured to exhibit the same features and/or operate substantially the same as its counterpart.

FIG. 2A shows hover touch 220a, in which the user provides an input at touch point 216 by holding his/her finger slightly above touch surface 214 at touch point 216. Hover touch 220a can be sensed using a mutual-capacitance or self-capacitance capacitive detection mode of multi-mode touch screen 212, for example, but would typically be undetectable using a resistive detection mode of multi-mode touch screen 212. By contrast, contact touch 220b, shown in FIG. 2B, can be reliably sensed using a self-capacitance capacitive detection mode of multi-mode touch screen 212, for example, and depending on the force of contact applied, is likely to be detected by a resistive detection mode of multi-mode touch screen 212 as well. Press touch 220c, shown in FIG. 2C, while readily detectable and distinguishable from contact touch 220b through a pressure sensitive resistive detection mode of multi-mode touch screen 212, such as the pressure sensitive resistive detection mode described above, is likely to be detectable but substantially indistinguishable from contact touch 220b through any capacitive detection mode of multi-mode touch screen 212.

As a result of the different extent to which each of user touches 220a, 220b, and 220c stimulates the capacitive sense elements of touch surface 214 and the resistive sense elements of touch surface 214, regardless of whether the sense elements are the same for all modes, each of those user touches can be distinguished from one another despite being applied to substantially the same touch point 216. Thus, according to the embodiment of the present inventive principles shown in FIGS. 2A through 2C, single touch point 216 can be utilized for three distinguishable, hence potentially different, user inputs, depending upon whether the user chooses to hover over touch point 216, make soft contact with touch point 216, or press hard at touch point 216. For example, if using multi-mode touch screen 212 to operate a digital camera, a user may hover over a sense element of multi-mode touch screen 212, corresponding to an image of a shutter release button, for example, to auto-focus the digital camera, then softly touch image to lock the focus, and then press hard on the image to capture a picture. By providing such functionality without a mechanical switch, for example, embodiments of the present invention may provide electronic devices with increased reliability and physical integrity while reducing overall size and cost.

The above description makes no distinction between single-touch touch sensitive screens and multi-touch touch sensitive screens. Consequently, the embodiments shown in FIGS. 1a and 1b and 2A through 2C are, in principle, compatible with either a single-touch or multi-touch approach to touch sensing. Thus, whether a touch screen is implemented as a single-touch touch screen or as a multi-touch touch screen, configuring that touch screen to support multiple capacitive detection modes or one or more capacitive detection modes and a resistive detection mode enables that touch screen to offer multi-mode functionality. Hence, in one embodiment, multi-touch touch sensing combining multiple capacitive or capacitive and resistive touch sensing of a user touch can be implemented as single-touch touch screen combining multiple capacitive detection modes or capacitive and resistive detection modes.

Figure 3:
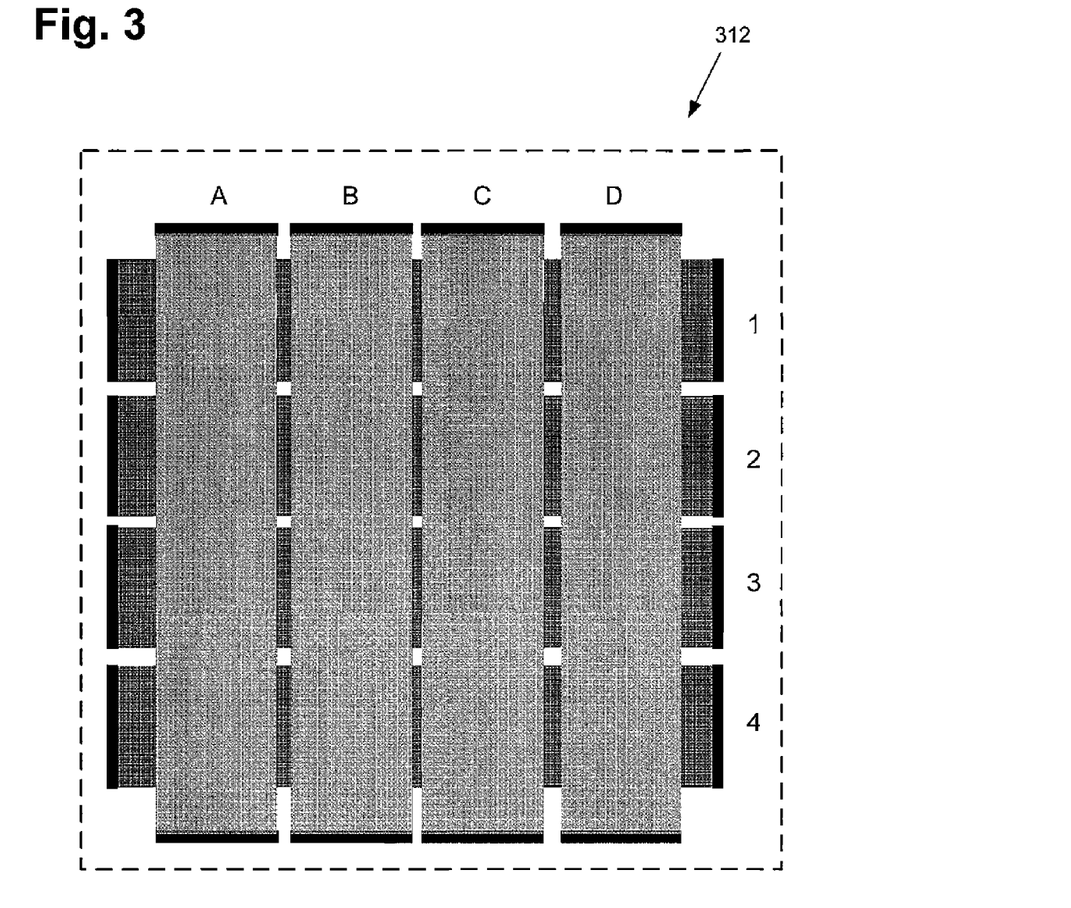
FIG. 3 presents a diagram of a system and method for providing enhanced touched sensing according to one embodiment of the present invention.

As shown in FIG. 3, however, in some embodiments a multi-mode touch screen combining, for example, multiple capacitive detection modes or capacitive and resistive detection modes can be implemented as a multi-touch multi-mode touch screen. FIG. 3 shows multi-touch multi-mode touch screen 312 including touch sensitive columns A, B, C and D, and touch sensitive rows 1, 2, 3 and 4. Multi-touch multi-mode touch screen 312 corresponds to multi-mode touch screen 112, in FIGS. 1a and 1b, as well as to multi-mode touch screen 212, in FIG. 2; e.g., each corresponding structure may be configured to exhibit the same features and/or operate substantially the same as its counterpart.

Continuing with FIG. 3, each of touch sensitive columns A, B, C, and D, and touch sensitive rows 1, 2, 3, and 4 can comprise a respective strip of resistive indium-tin-oxide, for example. Such a topology lends itself readily to resistive sensing of one or more user touches. For example, the grid pattern shown in FIG. 3 results in each overlapping region of the perpendicular columns and rows providing what is in effect an array of single-touch sense elements, similar to the two-layer sense elements described above. The number and dimensions of the perpendicular rows and columns may be adjusted to provide a desired degree of multi-touch granularity or sensor resolution over the entirety of a touch screen surface, or may be configured to provide varying granularity over a touch screen surface to balance overall capability, for example, against fabrication cost. For example, granularity may be made low at the edges of multi-touch multi-mode touch screen 312 where user input may be infrequent. Although in some embodiments multi-touch multi-mode touch screen 312 may be manufactured to exhibit such granularity permanently, in other embodiments, granularity of multi-touch multi-mode touch screen 312 may also be electronically or firmware programmable, for example, by including individually programmable electrical connections between adjacent rows and/or columns, for example. Such functionality enables programmatically trading scan rate, for example, against granularity in one or more portions of multi-touch multi-mode touch screen 312. Additionally, because the topology shown in FIG. 3 may be readily adapted to support one or more capacitive detection modes as well as a resistive detection mode, as has been explained fully above, the combination of rows and columns shown in FIG. 3 enable multi-touch multi-mode touch screen 312 to offer both multi-touch and multi-mode functionality.

An additional advantage accruing from implementation of the multi-touch multi-mode touch sensing approach disclosed herein is an enhanced ability for multi-touch multi-mode touch screen 312 to distinguish between an intentional user input and an inadvertent contact. For example, the present embodiments enable reliable palm or cheek rejection by integrating data corresponding to capacitively detected inputs with data corresponding to resistively detected inputs, to determine when a contact at the surface of a touch screen results from proximity of a gross physical object softly contacting the surface over a relatively large area, such as a cheek contact when placing a call, for example, or when it results from proximity of a gross physical object forcefully contacting the surface over a relatively small area, such as when using a gloved hand to provide user input. Both multi-mode touch screen 112, in FIG. 1, and multi-touch multi-mode touch screen 312, in FIG. 3, can be implemented so as to distinguish a touch caused by interaction with the user's cheek during a telephone call, for example, from a finger or stylus touch corresponding to an intended user input.

Figure 4:
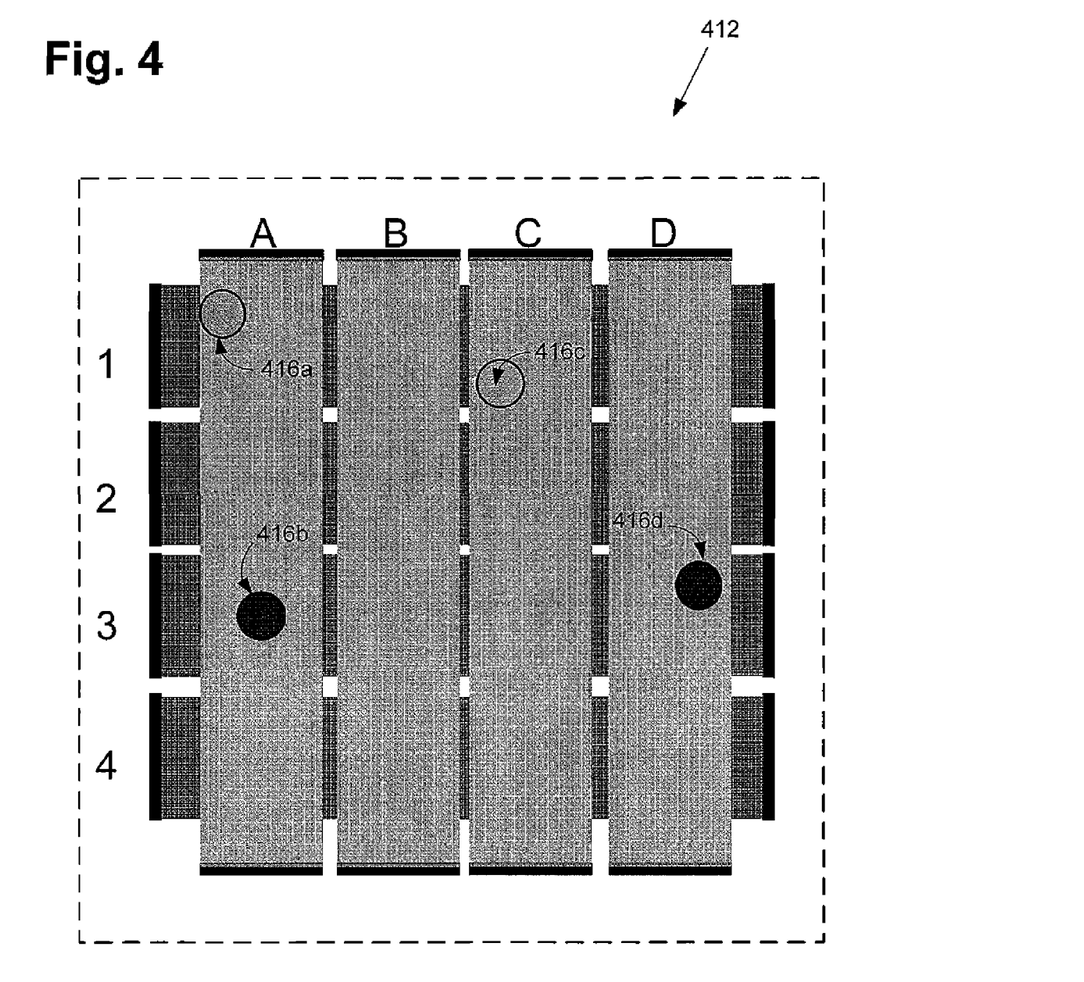
FIG. 4 presents a diagram of a system and method for providing enhanced touched sensing according to one embodiment of the present invention.

FIG. 4 shows multi-touch touch screen 412 including touch sensitive columns A, B, C and D and touch sensitive rows 1, 2, 3 and 4. Multi-touch touch screen 412 including touch sensitive columns A, B, C and D and touch sensitive rows 1, 2, 3 and 4 may correspond to multi-touch multi-mode touch screen 312 including touch sensitive columns A, B, C and D and touch sensitive rows 1, 2, 3 and 4, in FIG. 3, for example; e.g., each corresponding structure may be configured to exhibit the same features and/or operate substantially the same as its counterpart. Also shown in FIG. 4 are touch points 416a, 416b, 416c, and 416d, which are represented as being concurrently touched or activated on multi-touch touch screen user interface 412.

Whether touch detection is performed capacitively or resistively, conventional multi-touch systems typically encounter difficulties in properly processing multiple concurrent touches. Application of three or more concurrent touch inputs, such as those shown as being applied to touch points 416a, 416b, 416c, and 416d on multi-touch touch screen 412, for example, can result in the individual inputs shorting each other, or otherwise resulting in input cancellation. Because the geometry of the touch sensitive rows and columns included in multi-touch touch screen 412, by itself, may be insufficient to provide all the differentiators necessary to detect numerous concurrent touches, additional differentiators are needed.

According to various embodiments of the present invention, those additional differentiators can take the form of different loads, driving voltages, currents, and/or frequencies being applied to the respective touch sensitive rows and columns, and, as such, to the array of sense elements created by the arrangement of the touch sensitive rows and columns. For example, in one embodiment, differential characterization of touch points 416a, 416b, 416c and 416d can be achieved by driving touch sensitive rows 1, 2, 3 and 4, and touch sensitive columns A, B, C and D, with different current levels, such that the resulting test signals applied to sense elements A1, A3, C1 and D3 comprise different and distinct current levels. Upon such differentiation, the distinct concurrent inputs at touch points 416a, 416b, 416c and 416d may be determined by detecting return signals from the corresponding sense elements and determining the relative positions of each touch point within each corresponding sense element, as explained above with respect to a single touch point.

In some embodiments, the return signals may initially be in the form of a cumulative signal returning from, for example, the full array of sense elements of multi-touch touch screen 412, and an algorithm based interpretation of the cumulative concurrent input data can be performed to determine the relative positions of touch points 416a, 416b, 416c and 416d and, thus, the relative positions of objects forming those touch points, substantially concurrently. Such arrangement reduces the number of electrical traces needed to access each of the return signals, which reduces overall cost of fabrication. Similarly, an algorithm based interpretive process can be implemented to reliably identify and distinguish among concurrent touches applied at touch points 416a, 416b, 416c and 416d when different loads, voltages, or signal frequencies are applied to touch sensitive rows 1, 2, 3 and 4 and touch sensitive columns A, B, C and D, and, thus, differentiated test signals are applied to an array of sense elements formed by the touch sensitive rows and columns.

Because each sense element is distinguishable from another, and since, in some embodiments, a relative position of an object within the surface area of a sense element may be determined, rather than just the presence of an object within the bounds of the sense element, the number of rows and columns of multi-touch touch screen 412 may be reduced without also reducing the practical sense resolution of multi-touch touch screen 412. Thus, the manufacturing cost of multi-touch touch screen 412 may advantageously be reduced without also reducing the quality of the user experience. For example, the touch sensitive rows and columns of multi-touch touch screen 412 may be configured such that the size of each sense element is at least as large as the average size of a human fingertip. Thus, multi-touch touch screen 412 may detect multiple fingertips substantially concurrently at an accuracy sufficient for a high quality user experience, and may also detect the much finer detail of a single, finely pointed stylus sufficiently for written character detection and reproduction, yet be inexpensive enough to be implemented across a wide array of electronic devices. Furthermore, any reduction in the number of sense elements of, for example, multi-touch touch screen 412, may also produce a significant reduction in the power usage of multi-touch touch screen 412, thus advantageously extending the battery life of, for example, a mobile electronic device according to an embodiment of the present invention.

It should be noted that in some embodiments, the aforementioned test signals may be applied to all sense elements of multi-touch touch screen 412 substantially concurrently, thereby increasing responsiveness of multi-touch touch screen 412 relative to other embodiments where, for example, the aforementioned test signals are applied in a time-multiplexed manner in order to, for example, help differentiate one sense element from another. In particular, with respect to embodiments where multi-touch touch screen 412 is configured to support multiple capacitive detection modes or capacitive and resistive detection modes, for example, the aforementioned test signals may be used to probe all enabled detection modes substantially concurrently, or in a time-multiplexed manner, for example, to help differentiate one detection mode from another, or one sense element from another.

Furthermore, multi-touch touch screen 412 may be configured to support multi-mode functionality where one portion of multi-touch touch screen 412 is temporarily or permanently dedicated to a first selection of detection modes, while other portions are dedicated to different selections of detection modes, all of which may be probed substantially concurrently, or in a time-multiplexed manner, or in a manner dictated by a particular application for example.

For instance, multi-touch touch screen 412 may be configured to support a self-capacitance capacitive detection mode, a mutual-capacitance capacitive detection mode, and a resistive detection mode. During a sleep mode, multi-touch touch screen 412 may be configured to only enable a self-capacitance capacitive detection mode over a portion of multi-touch touch screen 412 corresponding to an image of a relatively small "wake" button, where all other detection modes are disabled, and all detection modes are disabled over the remainder of multi-touch touch screen 412, for example, in order to reduce power consumption associated with enabling unused detection modes or applying test signals to unused portions of multi-touch touch screen 412. While in such a sleep mode, multi-touch touch screen 412 may be configured to detect a far proximity of a human finger, for example, and then display the image of the "wake" button. If contact with the portion of multi-touch touch screen 412 displaying the "wake" button is subsequently affirmatively contacted by a human finger (e.g., a touch reliably distinguishable by a relatively low power self-capacitance capacitive detection mode), for example, multi-touch touch screen 412 may be configured to leave a sleep mode and enable all or a selection of detection modes for further user input. Thus, by being able to segregate portions of multi-touch touch screen 412 according to different detection modes, temporarily or permanently, multi-touch touch screen 412 may be configured to enable multi-mode functionality in addition to its multi-touch functionality.

In addition to providing direct manufacturing cost savings, however, embodiments of the present invention may also provide more reliable touch screen functionality in small electronic devices, for example. As is known in the art, touch sensing systems, including embodiments of the present invention, can be sensitive to interference from other electronic devices and systems, as well as to harmonics produced in their own internal electronic circuitry. Moreover, touch sensing systems may themselves present relatively large noise sources and degrade operation of nearby electronics. As such, conventional touch screens typically require bulky shielding or relatively large separation distances in order to coexist with other electronics in typical electronic devices. However, embodiments of the present inventive concepts may be configured to adaptively adjust frequencies of applied test signals, similar to using different test signal frequencies to differentiate between sense elements, as described above, and provide interference resistance and/or enable adaptive interference coexistence.

For example, referring once again to FIG. 4, multi-touch touch screen 412 can be rendered more resistant to electronic interference by adaptively varying the test signal frequencies applied to the sense elements of touch sensitive columns A, B, C and D and touch sensitive rows 1, 2, 3 and 4. For instance, one solution includes applying spread spectrum test signals to sense elements of the touch sensitive columns and rows in combination with detecting return signals from the sense elements using a correlation receiver. In cases where unacceptable interference is detected in a particular spectrum of a return signal, for example, a spectrum of applied test signals may then be adjusted to reduce the interference to acceptable levels, while retaining accurate and sensitive touch sense capability across the entirety of a touch screen surface. Furthermore, in addition to interference resistance, a spread spectrum approach has the additional advantage of being capable of reducing an average energy of an applied test signal, so that even where interference is present and cannot be entirely avoided, its effects on other electronics are substantially attenuated by the spread spectrum solution.

In some embodiments, the described spread spectrum approach may comprise a direct sequence spread spectrum approach, as known in the art, to minimize complexity of the implementation. However, in other embodiments, the spread spectrum approach may comprise a spread spectrum approach configured to both minimize interference and reduce susceptibility for eavesdropping on operation of an electronic device, for example, at the expense of added complexity.

In addition to using a spread spectrum approach, any other type of adaptive and/or frequency-diverse technique may be used, for example, including discrete multi-tone modulation (DMT)/orthogonal frequency-division multiplexing (OFDM), adaptive filtering, or even a single frequency technique that comprises a test signal having a programmatically adjustable frequency. Furthermore, interference may be detected in a return signal resulting from normal operation of one or more detection modes of a touch screen, for example, as described above, or may be detected in a return signal resulting from one or more test signals applied only to characterize the interference, or be detected in a return signal resulting from a null test signal, for example. For instance, detection of interference may be performed substantially concurrently with operation of one or more touch detection modes, for example, or may be performed in a time-multiplexed manner so that such detection does not overlap with operation of any touch detection mode.

As noted above, all modes of operation may be managed and enabled through use of a processor with or without an integrated DAC/ADC capability. For example, processor 111 in FIG. 1 may be configured to apply one or more adaptable test signals, including frequency-diverse test signals such as spread spectrum test signals, to one or more sense elements of multi-mode touch screen 112, where the applied adaptable test signals differentiate between sense elements and/or reduce interference. Processor 111 may also be configured to apply different loads to sense elements of multi-mode touch screen 112 to differentiate between sense elements. Processor 111 may be configured to then detect return signals from sense elements, possibly using a correlation receiver. Processor 111 may additionally be configured to then determine relative positions of objects corresponding to the return signals, as described more fully above. Alternatively, or in addition, processor 111 may be configured to detect interference in the return signals, and then to adapt or adjust the adaptable test signals to reduce the interference.

By providing the aforementioned cost effective and robust enhancements to both the types and number of concurrent touches sensed, embodiments of the present invention provide an enhanced touch sensing experience while decreasing overall cost and increasing utility of touch screens generally in electronic devices.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. An electronic system providing enhanced touch sensing, the electronic system comprising:
   a multi-mode touch screen including first and second resistive layers separated by an insulator; and
   a processor configured to:
      apply at least one test signal to a sense element of the multi-mode touch screen;
      detect at least one return signal from the sense element based on interaction of between the first and second resistive layers; and
      determine a relative position of a first object corresponding to the at least one return signal;
   the multi-mode touch screen using multiple detection mode to sense the first object, the multiple detection modes including at least a resistive touch detection mode and a capacitive touch detection mode.

2. The electronic system of claim 1, wherein the resistive touch detection mode includes a pressure sensitive resistive touch detection mode configured to distinguish between a soft touch position and a hard touch position that applies more pressure than the soft touch position.

3. The electronic system of claim 1, wherein the multiple detection modes include a mutual-capacitance capacitive detection mode and the multi-mode touch screen is further configured to sense the first object using a self- capacitance capacitive detection mode.

4. The electronic system of claim 1, wherein the multi-mode touch screen is configured to distinguish between a hover touch position, a soft touch position, and a hard touch position.

5. The electronic system of claim 1, wherein the sense element is configured to enable at least one of the multiple detection modes.

6. The electronic system of claim 1, wherein the multi-mode touch screen comprises a multi-touch multi-mode touch screen configured to sense the first object and at least one additional object substantially concurrently using at least one of the multiple detection modes.

7. The electronic system of claim 1, wherein the multi-mode touch screen comprises a multi-touch multi-mode touch screen, and wherein the processor is configured to apply at least one test signal to a plurality of sense elements of the multitouch multi-mode touch screen substantially concurrently.

8. An electronic system providing enhanced touch sensing, the electronic system comprising:
    a multi-touch touch screen including first and second resistive layers separates by an insulator; and
    a processor configured to:
        apply at least first and second test signals to respective first and second sense elements of the multi-touch touch screen, the first and second test signal being differentiated test signal;
        detect at least first and second return signals from the respective first and second sense elements based on interaction of between the first and second resistive layers; and
        determine first and second relative positions of first and second objects corresponding to the at least first and second return signals;
    the multi-touch touch screen sensing the first and second objects substantially concurrently using multiple detection modes which include at least a resistive touch detection mode and a capacitive touch detection mode.

9. The electronic system of claim 8, wherein the multiple detection modes include a pressure sensitive resistive touch detection mode configured to distinguish between a soft touch position and a hard touch position, the hard touch position exerting more pressure than the soft touch position.

10. The electronic system of claim 8, wherein the first and second test signals comprise respective first and second current levels.

11. The electronic system of claim 8, wherein the first and second test signals comprise respective first and second frequencies.

12. The electronic system of claim 8, wherein the first and second test signals comprise respective first and second voltages.

13. The electronic system of claim 8, wherein the application of first and second test signals further comprises application of respective first and second loads to the first and second sense elements.

14. The electronic system of claim 8, wherein the multi-touch touch screen comprises a multi-touch multi-mode touch screen configured to sense the first and second objects using the multiple detection modes.

15. The electronic system of claim 8, wherein the multi-touch touch screen comprises a multi-touch multi-mode touch screen configured to sense the first and second objects using at least one of a pressure sensitive resistive detection mode and a capacitive detection mode.

16. The electronic system of claim 8, wherein the multi-touch touch screen comprises a multi-touch multi-mode touch screen configured to sense the first and second objects using at least one of a mutual-capacitance capacitive detection mode and a self-capacitance capacitive detection mode.

17. An electronic system providing enhanced touch sensing, the electronic system comprising:
    a touch screen including first and second resistive layers separated by an insulator; and
    a processor configured to:
        apply one or more frequency-diverse adaptable test signals to at least one sense element of the touch screen;
        detect at least one return signal from the at least one sense element;
        detect interference in the at least one return signal based on interaction of between the first and second resistive layers;
        adapt the one or more frequency-diverse adaptable test signals to reduce the interference; and
        sense an object on the touch screen based on the at least one return signal using multiple detection modes including a resistive touch detection mode and a capacitive touch detection mode.

18. The electronic system of claim 17, wherein the touch screen comprises a multi-mode touch screen.

19. The electronic system of claim 17, wherein the touch screen comprises a multi-touch touch screen.

20. A method of providing enhanced touch sensing using a processor in an electronic system having a multi-mode touch screen, the method comprising:
    applying at least one test signal by the processor to a sense element of the multimode touch screen, the multi-mode touch screen being configured to sense a first object using multiple detection modes including a resistive touch detection mode and a capacitive touch detection mode, the multi-mode touch screen including first and second resistive layers separated by an insulator;
    detecting at least one return signal from the sense element based on interaction of between the first and second resistive layers; and
    determining a relative position of the first object corresponding to the at least one return signal.

21. The method of claim 20, wherein the resistive touch detection mode includes a pressure sensitive resistive touch detection mode configured to distinguish between a soft touch position and a hard touch position in which exerted pressure is higher that a pressure exerted in the soft touch position.

22. The method of claim 20 further comprising distinguishing between a hover touch position, a soft touch position, and a hard touch position.

23. An electronic system providing enhanced touch sensing, the electronic system comprising:
    a multi-touch touch screen including first and second resistive layers separated by an insulator; and
    a processor configured to:
        apply at least one test signal to first and second sense elements of the multi-touch touch screen;
        detect at least first and second return signals from the respective first and
    second sense elements based on interaction of between the first and second resistive layers; and
        determine first and second relative positions of first and second objects corresponding to the at least first and second return signals;
        the multi-touch touch screen being capable of sensing the first and second objects substantially concurrently,
    wherein the multi-touch screen senses at least one of the first and second objects using multiple detection modes including a resistive touch detection mode and a capacitive touch detection mode.

24. The electronic system of claim 23, wherein the multi-touch touch screen senses both of the first and second objects using a resistive touch detection mode.

25. The electronic system of claim 23, wherein the multi-touch touch screen senses at least one of the first and second objects using a pressure sensitive resistive touch detection mode capable of distinguishing between a soft touch position and a hard touch position.

26. The electronic system of claim 23, wherein the application of the at least one test signal further comprises application of first and second loads to the first and second sense elements.

27. The electronic system of claim 23, wherein the multi-touch touch screen comprises a multi-touch multi-mode touch screen;
    the multi-touch multi-mode touch screen being capable of sensing the first and second objects using at least one of first and second detection modes.

28. The electronic system of claim 23, wherein the multi-touch touch screen comprises a multi-touch multi-mode touch screen;
    the multi-touch multi-mode touch screen being capable of sensing the first and second objects using at least one of a pressure sensitive resistive touch detection mode and a capacitive detection mode.

\* \* \* \* \*